United States Patent
Winters

(10) Patent No.: US 7,325,625 B1
(45) Date of Patent: Feb. 5, 2008

(54) FLOOR COVERING REMOVAL AND IMPACT TOOL

(75) Inventor: Larry Winters, Milwaukee, WI (US)

(73) Assignee: Fathom Leaks, LLC, Milwaukee, WI (US)

( * ) Notice: Subject to any disclaimer, the term of this patent is extended or adjusted under 35 U.S.C. 154(b) by 29 days.

(21) Appl. No.: 11/186,351

(22) Filed: Jul. 21, 2005

(51) Int. Cl.
*B25C 1/02* (2006.01)

(52) U.S. Cl. .......................... 173/90; 173/91; 173/132; 30/169; 299/37.5

(58) Field of Classification Search ................. 173/90, 173/91, 132, 29; 227/147; 81/27, 463; 30/169, 30/277; 299/37.5
See application file for complete search history.

(56) References Cited

U.S. PATENT DOCUMENTS

| | | | | |
|---|---|---|---|---|
| 3,036,482 | A * | 5/1962 | Kenworthy et al. | 173/90 |
| 4,241,795 | A * | 12/1980 | Landry, Jr. | 173/90 |
| 5,010,647 | A * | 4/1991 | Gray | 30/169 |
| 5,040,614 | A * | 8/1991 | Nash | 172/18 |
| 5,097,912 | A * | 3/1992 | Bowers | 173/90 |
| 5,370,192 | A * | 12/1994 | Evinger | 173/90 |
| 5,542,479 | A * | 8/1996 | Stachler et al. | 173/90 |
| 5,662,386 | A * | 9/1997 | Newman et al. | 299/37.5 |
| 5,865,490 | A * | 2/1999 | Vowell | 294/57 |
| 6,125,719 | A * | 10/2000 | Lowther et al. | 81/27 |
| 6,148,929 | A * | 11/2000 | Winters | 173/91 |
| 6,347,672 | B1 * | 2/2002 | Reardon | 173/90 |
| 6,474,198 | B2 * | 11/2002 | Lowther | 81/27 |

* cited by examiner

*Primary Examiner*—Scott A. Smith
(74) *Attorney, Agent, or Firm*—Andrus, Sceales, Starke & Sawall, LLP

(57) ABSTRACT

An impact tool particularly useful for floor removal material includes an elongated removable rod having an upper end and a lower end. A handle is connected to the upper end of the rod, and an anvil is fixed to the lower end of the rod. A collar is mounted above the anvil with the rod passing therethrough. A replacement blade unit is disposed below the anvil and has an upper portion and a lower portion having a separating blade edge. A pair of guide rods extends between the collar and the upper portion of the blade unit and passes through the anvil on opposite sides of the rod. The guide rods enable sliding movement of the anvil therealong between the collar and the blade unit as the handle and rod are moved up and down. A tubular sheath is telescoped over a portion of the rod, the collar, the anvil and the upper portion of the blade unit, and is connected to the upper portion of the blade unit.

6 Claims, 4 Drawing Sheets

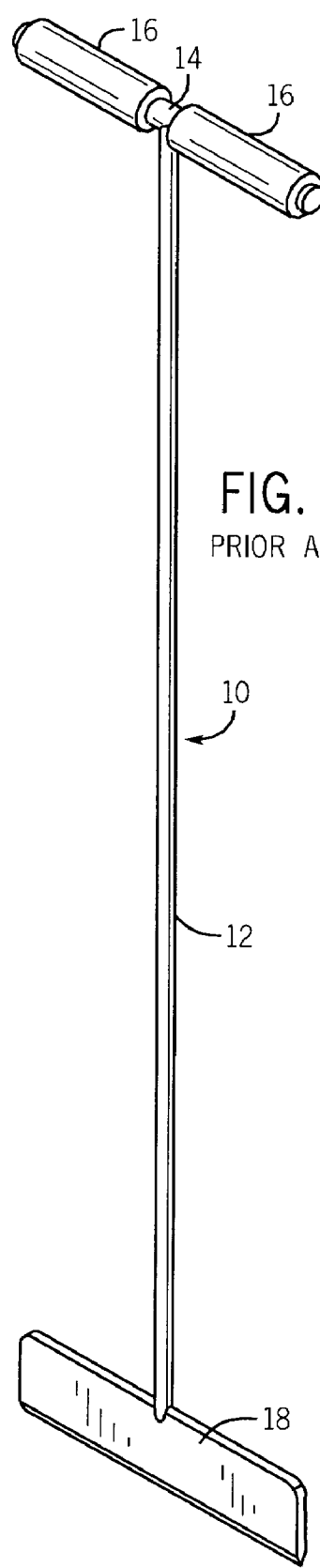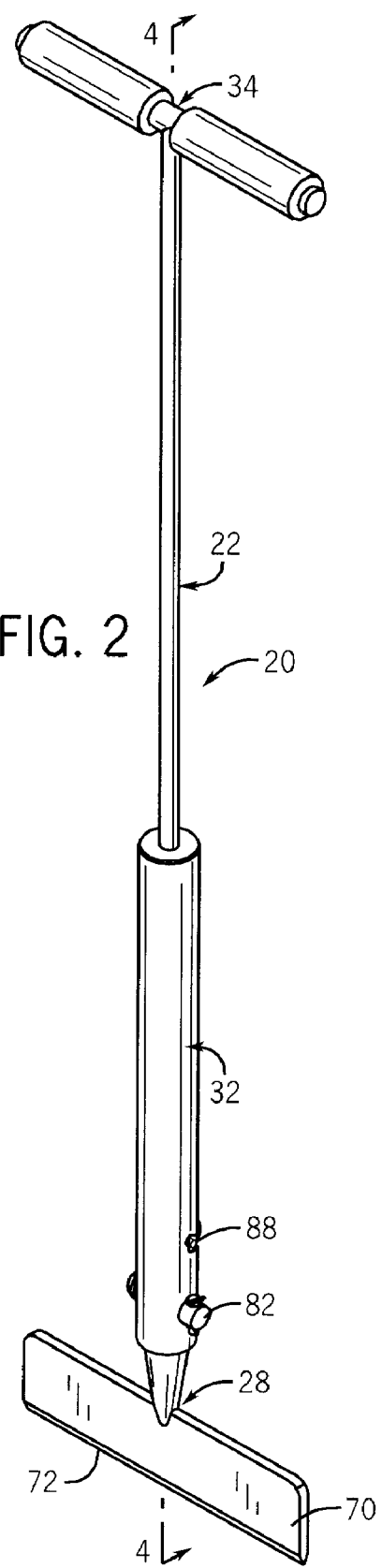

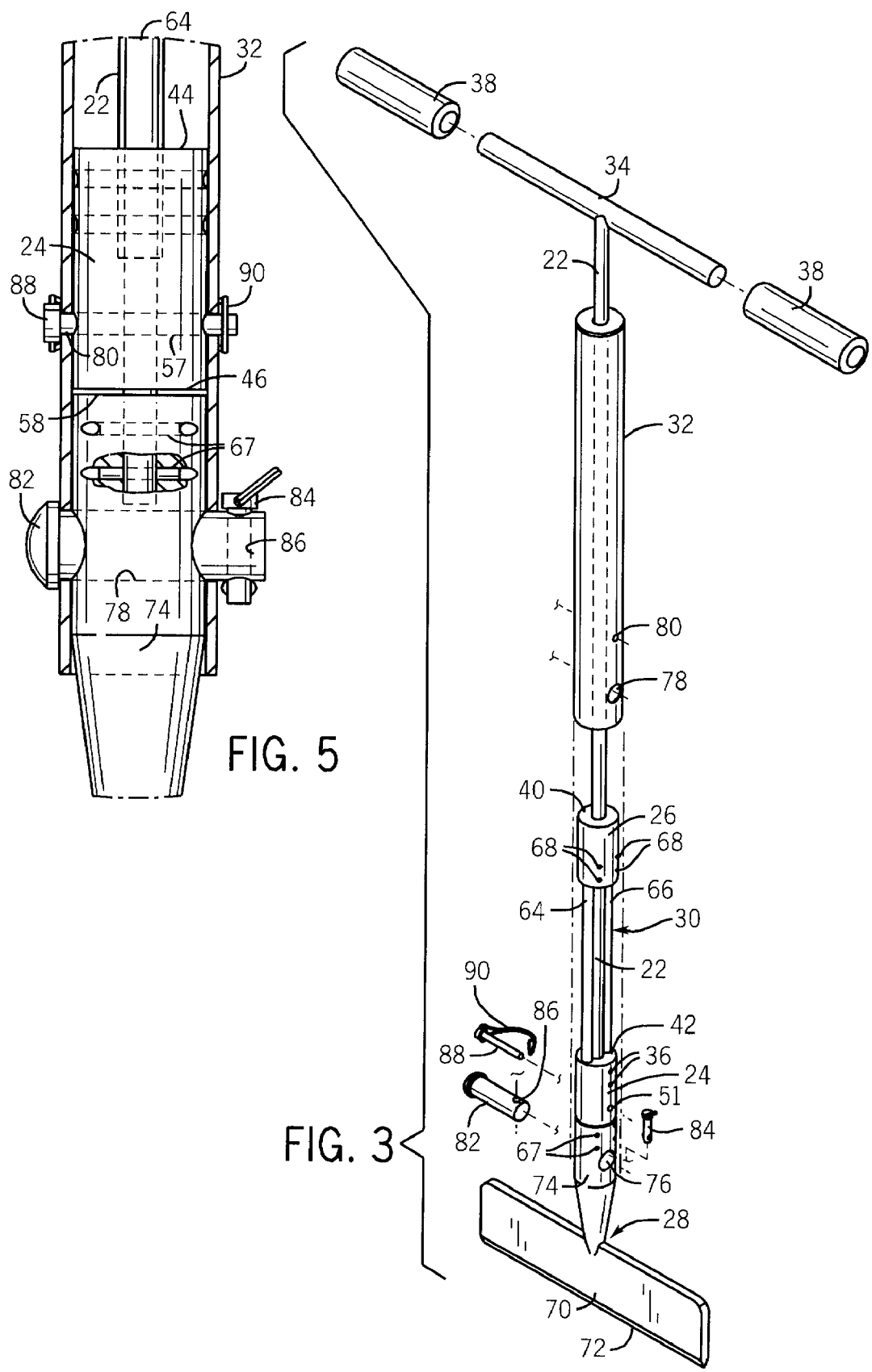

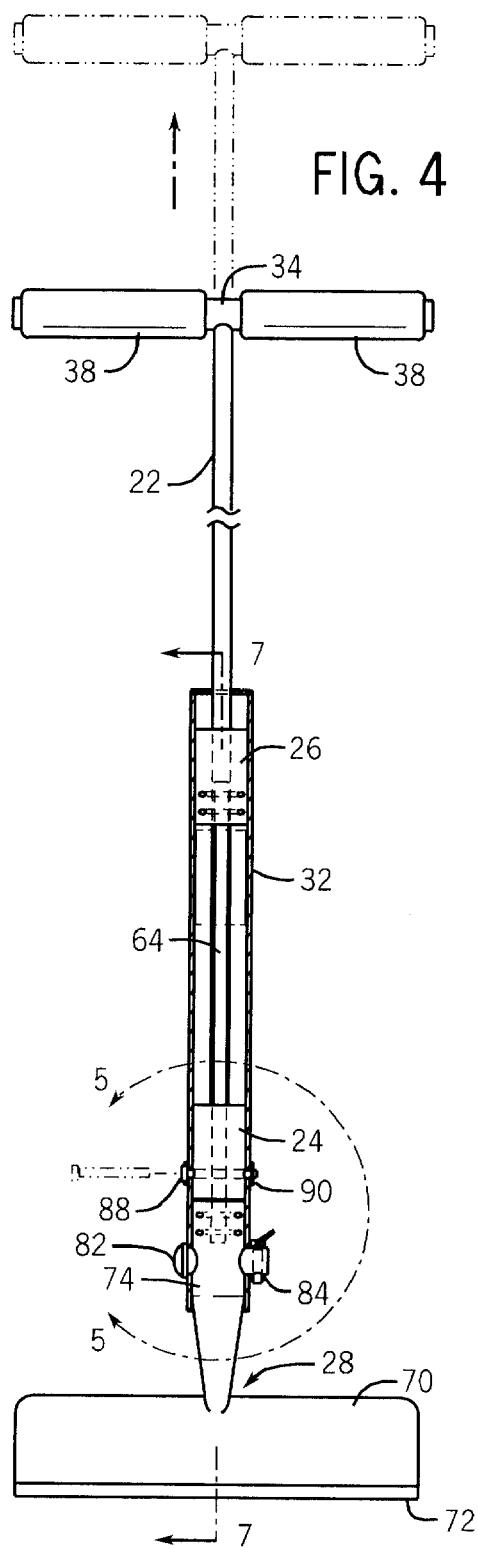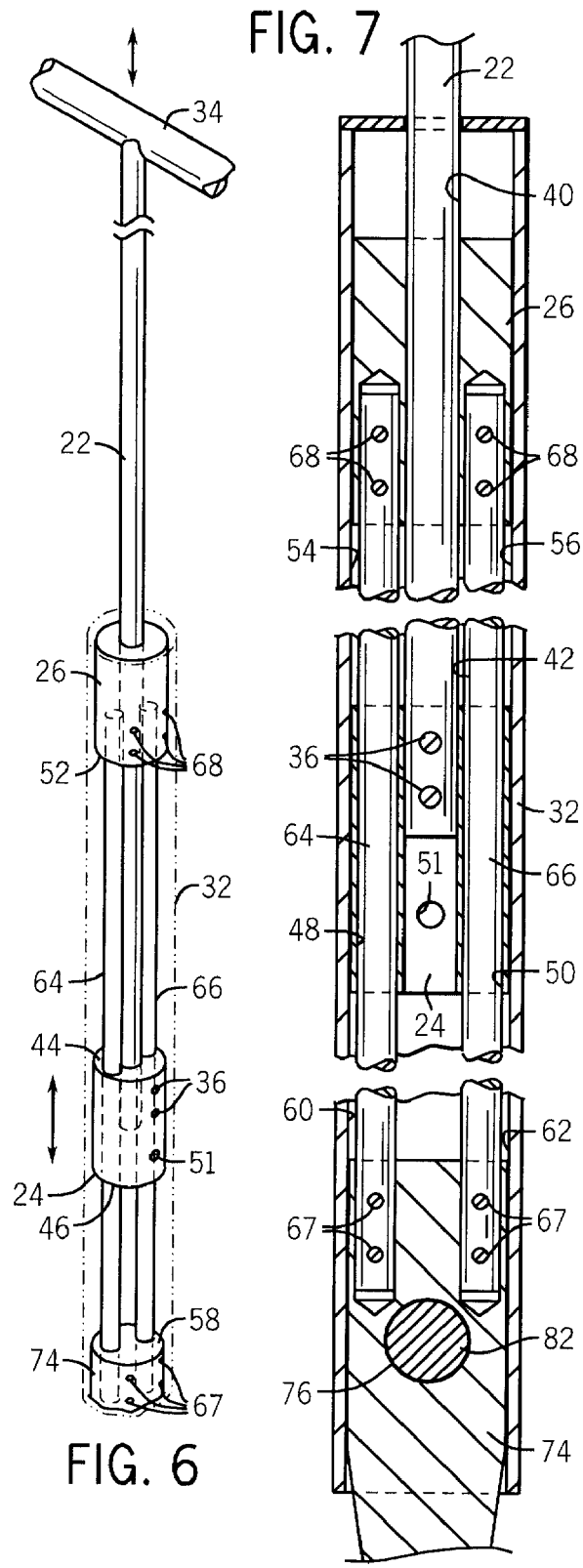

FLOOR COVERING REMOVAL AND IMPACT TOOL

FIELD OF THE INVENTION

The present invention relates generally to a manually-operated impact tool and, more particularly, pertains to an impact tool for enabling the removal of floor covering such as carpet and tile.

BACKGROUND OF THE INVENTION

Applicant is the inventor of a feeler rod for water mains as disclosed in U.S. Pat. No. 6,148,929 issued Nov. 21, 2000. In this patent, a leak detection device is provided to locate fluid leaks in a ground surface and includes an elongated rod having a handle transversely attached thereto. The device includes an anvil fixed to the rod and having a pair of spaced openings formed therethrough. A first collar is slidably mounted on the rod in spaced relationship above the anvil for selective engagement therewith. A second collar is slidably mounted on the rod in spaced relationship below the anvil for selective engagement therewith. A guide rod structure extends between the first and second collars and passes through openings formed in the anvil on opposite sides of the rod. A sheath surrounds the anvil, the first and second collars and the guide rod structure, and is connected to the second collar. A T-shaped handle has a central portion receiving the rod therethrough and covers an upper portion of the first collar, the central portion being connected to a top end of the sheath. Pushing downwardly on the handle and axially of the rod will cause the first collar to strike the anvil and drive the rod downwardly into the ground surface. Pulling upwardly on the handle will cause a second collar to strike the anvil and retract the rod upwardly from the ground surface. Rotating the handle will cause the rod to rotate.

Applicant had discovered it is a laborious and exhaustive task to remove carpeting as well as ceramic and vinyl tiles from floor surfaces. Recognizing this problem, applicant has modified the structure set forth in the '929 patent to provide an effective floor removal tool which utilizes the basic impact principle of the feeler rod and makes it easier for one involved in the often difficult removal of floor covering.

SUMMARY OF THE INVENTION

It is a general object of the present invention to provide a manually-operated impact tool having a blade on a working end thereof.

It is also an object of the present invention to provide an impact tool for removing carpet, vinyl tile, ceramic tile and other floor coverings.

It is a further object of the present invention to incorporate a slide hammer structure into a floor covering removal tool.

It is another object of the present invention to provide a low tech tool which does not require air or electricity to operate.

It is an additional object of the present invention to provide an impact tool having a removable blade unit which functions as a lower collar struck by an anvil.

In one aspect of the invention, an impact tool includes an elongated movable rod having an upper end and a lower end. A handle is connected to the upper end of the rod, and an anvil is fixed to the lower end of the rod. A collar is mounted above the anvil with the rod passing therethrough. A replaceable blade unit is disposed below the anvil and has an upper portion defining an impact surface engagable with the anvil, and the lower portion having a separating blade edge. A pair of guide rods extends between the collar and the upper portion of the blade unit, and passes through the anvil on opposite sides of the rod. The guide rods enable sliding movement of the anvil therealong between the collar and the blade unit as the handle and rod are moved up and down. A tubular sheath is telescoped over a portion of the rod, the collar, the anvil and the upper portion of the blade unit, and is connected to the upper portion of the blade unit.

The handle and the anvil are movable relative to the collar, the guide rods, the sheath and the blade unit. The sheath prevents entry of foreign material and engagement of one's hands between the collar and the blade unit. The anvil and the collar are both cylindrically shaped. The collar and the blade unit are attached to the guide rods by fasteners. The anvil is attached to the rod by fasteners also. The sheath is held fixed on the blade unit by means of a retaining bolt passing through aligned throughholes formed in the upper portion of the blade unit and the sheath. A locking device passes through the sheath and the rod for preventing sliding movement of the rod and the anvil.

In another aspect of the invention, there is provided an impact and floor covering removable tool including an elongated movable rod having an upper end and a lower end. A handle is connected generally transversely to the upper end of the rod. An anvil is fixed to the lower end of the rod and has a pair of spaced openings formed therethrough. A collar is mounted above the anvil for selective engagement therewith, the rod passing through the collar. A replaceable blade unit is disposed below the anvil and has an upper fluted portion disposed for selective engagement with the anvil, and a lower blade edge portion adapted to be wedged between a floor surface and a floor covering. A guide rod structure extends between the collar and the upper fluted portion and passes through the openings in the anvil on opposite sides of the rod. The guide structure enables sliding movement of the anvil between the collar and the blade unit. A sheath surrounds the collar, the anvil and portions of the rod and the blade unit. The sheath is removably connected to the upper portion of the blade unit. A locking arrangement selectively connects the sheath and the rod to prevent sliding movement of the rod and anvil relative to the collar, blade unit, guide rod structure and sheath.

Various features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a prior art floor covering removal tool;

FIG. 2 is a perspective view of the floor covering removal tool embodying the present invention;

FIG. 3 is a partially exploded view of FIG. 2;

FIG. 4 is a cross-sectional view taken on line 4-4 of FIG. 2;

FIG. 5 is a an enlarged detail view taken on line 5-5 of FIG. 4;

FIG. 6 is a partial perspective view showing the relative motion of the anvil relative to the collar and the blade unit;

FIG. 7 is an enlarged cross-sectional view taken on line 7-7 of FIG. 4.

DETAILED DESCRIPTION OF THE INVENTION

Figure 8:
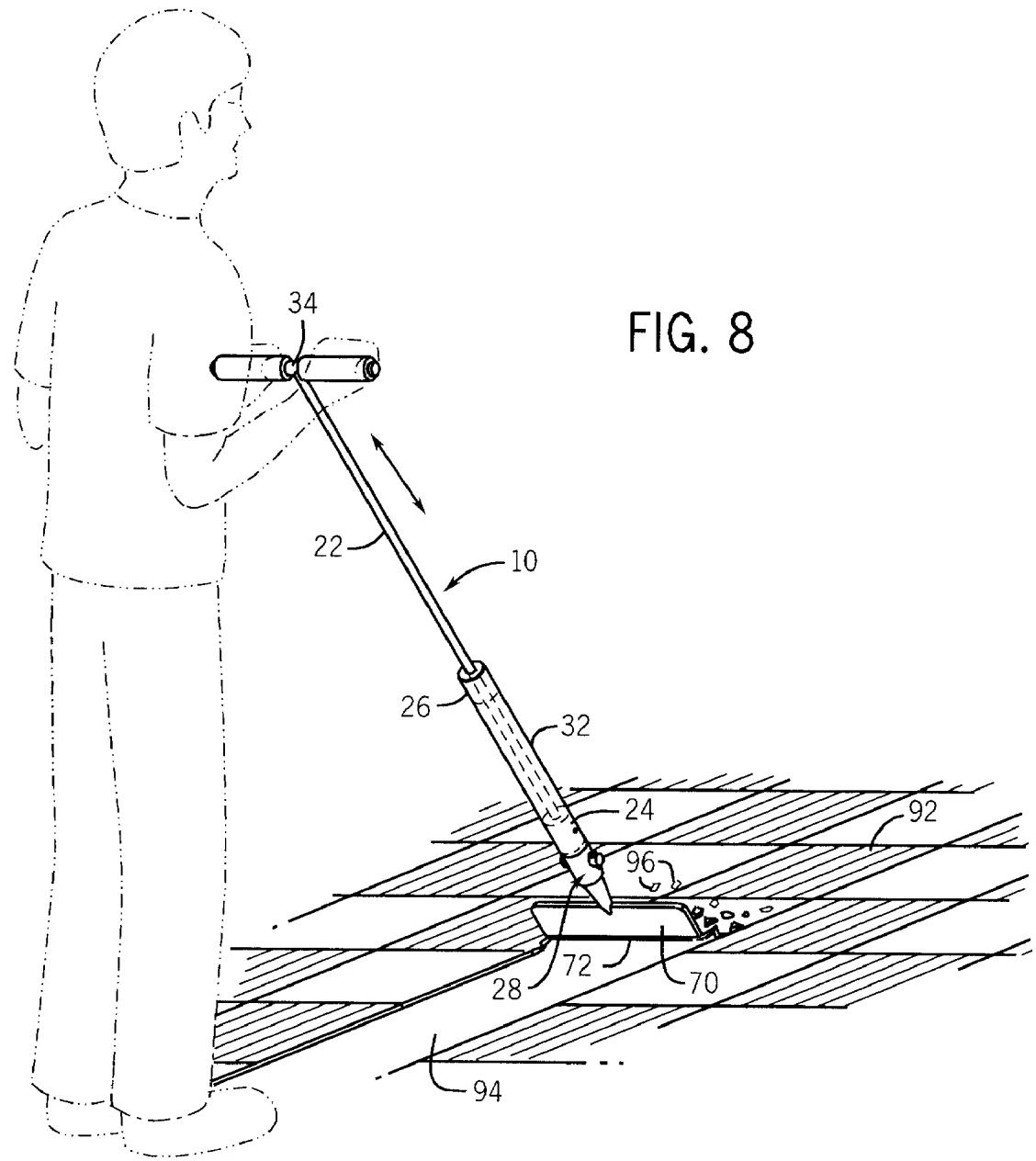
FIG. 8 is a pictorial representation of the floor covering removal tool in use.

Referring now to FIG. 1, thereshown is a prior art floor covering removal tool 10 which is comprised of an elongated solid rod 12 and a solid handle 14 fixed such as by welding to the top of the rod 12. The opposite ends of the handles 14 are typically equipped with rubber handgrips 16 to protect one's hands during use. The bottom of the rod 12 is provided with a blade 18 for engaging a floor covering element intended for removal. The rod 12, handle 14, and blade 18 are fabricated from a rigid metal such as steel which will withstand the forces applied to the rod 12 as the tool 10 is moved in a shoveling motion to drive the blade 18 between carpet or tile and a floor surface to which the carpet or tile is attached.

FIGS. 2-6 illustrate a floor covering removal and impact tool 20 embodying the present invention. The impact tool 20 is comprised of an elongated movable solid rod 22, a movable solid cylindrical anvil 24, a cylindrical collar 26, a replaceable blade unit 28, a guide rod structure 30, a protective, cylindrical tubular sheath 32 and a cylindrical handle 34. Preferably, all components of the tool 20 are constructed of hard metal, such as steel.

Rod 22 has a lower end attached to the anvil 24 by means of fasteners 36, and an upper end which is secured transversely, such as by welding, to the handle 34. Opposite ends of the handle 34 are provided with outwardly projecting rubber grips 38 to prevent slippage in the operator's hands during usage of the tool 20. Rod 22 passes through a central bore 40 extending through the cylindrical collar 26.

Anvil 24 is formed with a throughbore 42 for receiving the rod 22 and has an upper contact surface 44 and a lower contact surface 46. Anvil 24 is also provided throughout its length with a pair of tubular openings 48, 50 lying parallel to the throughbore 42, there being one opening on each side of the throughbore 42. Anvil 24 is further provided with a transverse passage 51 to facilitate a locked position of the tool 10 as will be described below.

The cylindrical collar 26 has a lower contact surface 52 engageable with the upper contact surface 44 of anvil 24. In addition, the collar 26 is formed with a pair of apertures 54, 56 which are aligned with the anvil openings 48, 50. An upper contact surface 58 of the blade unit 28 is also formed with a pair of depressions 60, 62 which are aligned with anvil openings 48, 50.

Guide rod structure 30 includes a pair of parallel guide rods 64, 66, each having a lower end anchored in depressions 60, 62 by fasteners 67, and an upper end secured in apertures 54, 56 of collar 26 by fasteners 68. The guide rods 64, 66 pass through the anvil openings, 48, 50 on each side of rod 22. In this manner, the collar 26 and the blade unit 28 are held in spaced-apart relationship from one another. As shown in FIG. 6, moving the rod 22 up and down causes the anvil 24 to move along the guide rods 64, 66 between fixed collar 26 and fixed blade unit 28. The lower contact surface 52 of collar 26 is selectively engagable with the upper contact surface 44 of anvil 24. The upper contact surface 58 of blade unit 28 is selectively engagable with the lower contact surface 46 of anvil 24.

The removable and replaceable blade unit 28 has a lower portion in the form of a generally rectangular blade 70 having a spring steel, broad lower separating edge 72 engagable with various objects, preferably floor covering material such as carpet and different types of tile. The lower portion 70 is formed integrally with a fluted upper portion 74 carrying the upper contact surface 58. The upper portion 74 is provided with a large throughhole 76 which lies transverse to the longitudinal axis of the rod 22.

The tubular protective sleeve 32 has an open top and an open bottom so that the sheath 32 may be telescoped over a portion of the rod 22, the anvil 24, the collar 26, the upper portion 74 of blade unit 28, and the guide rods 64, 66. The sheath 32 is formed at its lower end with a large throughhole 78 which is aligned with throughhole 76 in the upper portion 74 of the blade unit 28. The sheath 32 is further designed with a transverse passageway 80 in register with the passage 51 formed in anvil 24. When the tool 10 is assembled, a headed retainer bolt 82 is passed through throughholes 76, 78, and a first retaining pin 84 is inserted through a retaining hole 86 formed in the end of the retaining bolt 82. The retainer bolt 82 serves to hold the sheath 32 in fixed surrounding relationship relative to the rod 22, the anvil 24, the collar 26, the upper portion 74 of blade unit 28 and the guide rods 64, 66 during normal operation of the tool. With the sheath 32 in fixed position, a second retaining pin 88 can be passed through aligned passage 51 and passageway 80 and held in place by a retainer strap 90. Pin 88 has the effect of preventing any sliding movement of the rod 22 and anvil 24 relative to the remaining components of the tool 10 and creating a locked position.

FIG. 6 shows the exemplary manner in which the impact tool 10 is employed to remove floor covering such as tile 92. In an operating position, the pin 88 and strap 90 are removed so that up and down movement of the handle 34 will cause corresponding sliding movement of the rod 22 and anvil 24 relative to collar 26 and blade unit 28. Gravity normally causes the anvil 24 to rest upon the upper contact surface 58 of the blade unit 28 as seen in FIGS. 3 and 4. The lower edge 72 of blade 70 is wedged between the floor 94 and the tile 92, and the handle 34 and rod 22 are first moved up (FIG. 4) and then down between collar 26 and blade unit 28 causing an impact force to be delivered to the blade 70 as anvil 24 forcefully strikes the upper contact surface 58 of blade unit 28. Repeated impact force transmitted to the blade 70 effectively separates and moves the tile 92 from the floor 94 typically in pieces 96. The anvil 24 thus acts as a sliding driving hammer against the blade unit 28.

It should be understood that the guide rods 64, 66 and the sheath 32 cooperate to rigidify and stabilize the rod 22 as axial and tortional forces are applied. The sheath 32 prevents dirt and foreign material from becoming lodged between the collar 26 and the blade unit 28, and keeps a worker's hands from being pinched between moving and stationary components. When it is desired to replace the blade unit 28, the bolt 82 is extracted enabling sheath 32 to be slidably raised, as in FIG. 3, after which fasteners 67 may be removed and a replacement blade unit 28 may be installed. Sheath 32 is then lowered over the upper portion 74 of blade unit 28 and bolt 82 is reinserted in aligned throughholes 76, 78. When floor covering material removal is finished, the pin 88 is replaced so that the tool 10 is in locked position and can be transported without relative movement of the tool components.

While the invention has been described preferably as a floor covering removal tool, it should be understood that the blade-equipped impact tool 10 may have other practical applications, such as ice chopping, small diameter tree trunk or root extraction, roof shingle removal, etc.

Various alternatives and embodiments are contemplated as being within the scope of the following claims particularly pointing out and distinctly claiming the subject matter regarded as the invention.

I claim:

1. An impact tool comprising:

an elongated movable rod having an upper end and a lower end;

a handle connected to the upper end of the rod;

an anvil fixed to the lower end of the rod;

a collar mounted above the anvil with the rod passing therethrough;

a replacement blade unit disposed below the anvil and having an upper portion defining an impact surface engagable with the anvil, and a lower portion having a separating blade edge;

a pair of guide rods extending between the collar and the upper portion of the blade unit, and passing through the anvil on opposite sides of the rod, the guide rods enabling sliding movement of the anvil therealong between the collar and the blade unit as the handle and rod are moved up and down, the guide rods having upper ends joined to the collar by a first set of fasteners passing transversely therethrough and having lower ends secured to the upper portion of the blade unit by a second set of fasteners passing transversely therethrough;

a tubular sheath telescoped over and around and slidably mounted relative to a portion of the rod, the collar, the anvil and the upper portion of the blade unit, and removably connected to the upper portion of the blade unit by a single removable retaining bolt passing through aligned throughholes formed in the upper portion of the blade unit and the sheath, the bolt passing entirely through the upper portion of the blade unit and the sheath and being retained in place by a retaining pin; and a removable locking pin selectively connecting the sheath and the anvil and passing entirely through the sheath and the anvil for preventing sliding movement of the rod and the anvil, the locking pin being retained in place by a retaining strap;

wherein, upon removal of the retaining bolt and the locking pin, the sheath is slidably raised to permit removal of the second set of fasteners so that the blade unit can be replaced.

2. The impact tool of claim 1, wherein the handle and the anvil are movable relative to the collar, the guide rods, the sheath, and the blade unit.

3. The impact tool of claim 1, wherein the sheath prevents entry of foreign material and engagements of one's hands between the collar and the blade unit.

4. The impact tool of claim 1, wherein the anvil is cylindrically shaped.

5. The impact tool of claim 1, wherein the collar is cylindrically shaped.

6. The impact tool of claim 1, wherein the anvil is attached to the rod by a third set of fasteners.

* * * * *